Jan. 12, 1971   I. C. CHEESEMAN ET AL   3,554,664
REINFORCED PLASTIC BLADES
Filed May 16, 1968   2 Sheets-Sheet 1

FIG. I.

United States Patent Office 3,554,664
Patented Jan. 12, 1971

3,554,664
REINFORCED PLASTIC BLADES
Ian Clifford Cheeseman and Charles Reginald Lawrence, Camberley, and Thomas George Holmes Woolford, Farnborough, England, assignors to Minister of Technology in Her Britannic Majesty's Government of the United Kingdom of Great Britain and Northern Ireland, London, England
Filed May 16, 1969, Ser. No. 825,188
Claims priority, application Great Britain, May 20, 1968, 23,876/68
Int. Cl. B64c 27/18
U.S. Cl. 416—90   9 Claims

ABSTRACT OF THE DISCLOSURE

A helicopter rotor blade comprises a thin section hollow steel spine attached to a root section and with a fibre glass sheath moulded on to it to give the required profile. Sections of the sheath are cut away and faired by metal sheeting to provide fluid ducts extending along the blade. Slots formed in the metal sheeting enable air to be discharged over the blade surface for circulation control purposes. The ducts and slots are in three separate spanwise sections, of which the outer two are supplied with air passing along the hollow spine which is suitably provided with baffles. High tensile steel wires extending axially through the sheath and attached to the root section and the spine in the region of the blade lip act to restrict blade flexing and any consequent distortion of the slots. The use of carbon or other fibres is envisaged as are variations in the direction of the lay of the fibres, including a lattice structure.

---

The invention relates to fibre reinforced plastics blades which may be used, for example, in propellers or helicopter rotors.

The use of reinforced plastics materials in such blades offers many advantages when compared with metal including ease of manufacture, a high strength to weight ratio, and lower costs. Reinforced, plastics materials are non-corrosive, weather-resistant, have a good fatigue life and their physical properties are largely unaffected by atmospheric conditions.

However, the low shear strength of reinforced plastics generally leads to root-end attachment difficulties.

It is often convenient, for a variety of reasons, to construct reinforced plastics blades around a metal spine, and the invention seeks to utilize such a spine to improve the shear strength of a fibre reinforced blade at its root-end. This arrangement may be utilized with advantage where passages are to be formed with a blade to conduct air or or the fluid for discharge from apertures formed in the blade surface and extending along its length so as to influence circulation around the blade and modify the lift thereon as is disclosed, for instance, in British patent specification No. 1,073,418 and prior co-pending patent application No. 22,070/67.

Thus, according to the invention, a fibre reinforced plastics blade is formed around a hollow spine member extending substantially along the span of the blade and provided with a root attachment portion, the spine member serving to conduct fluid to at least one aperture formed in the blade surface for discharge therefrom.

Figure 1:
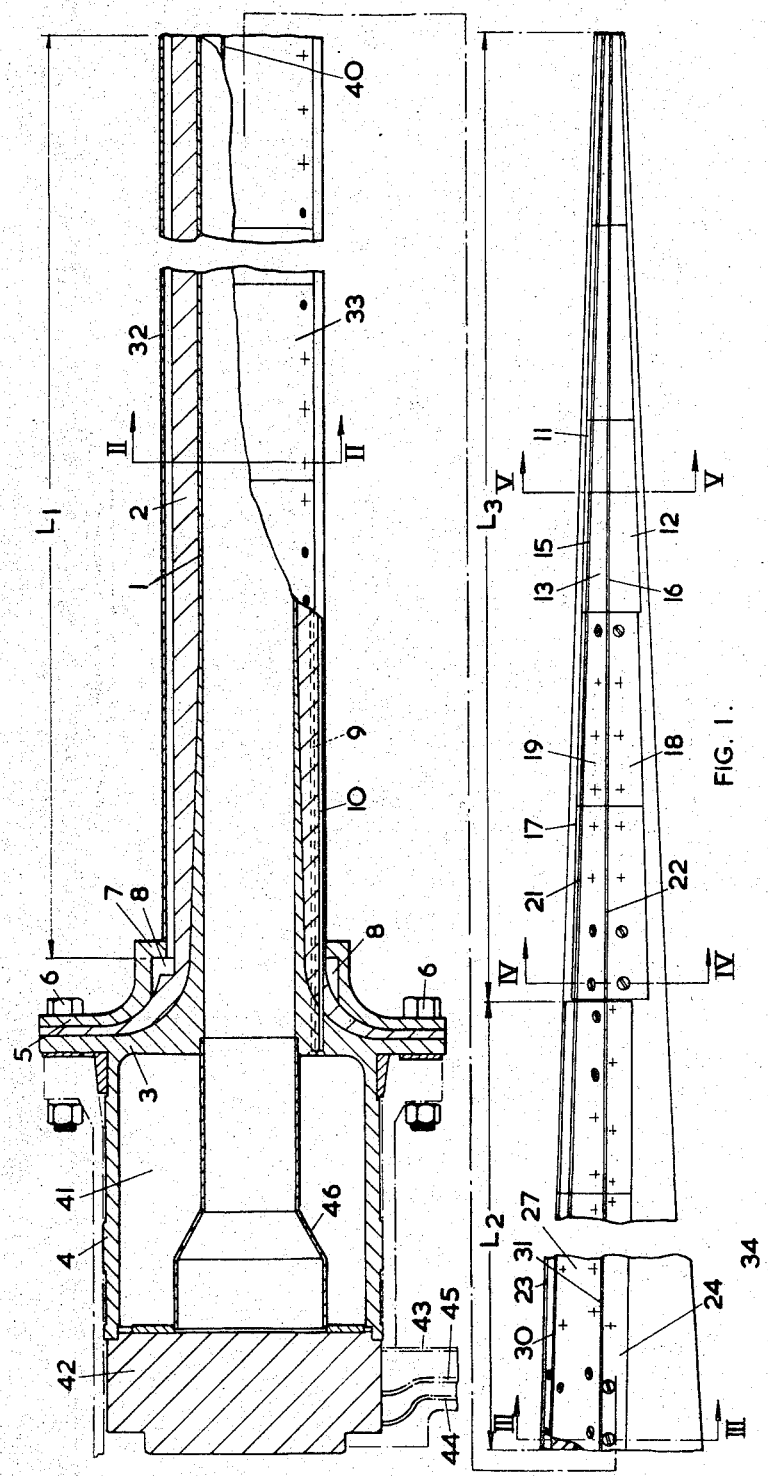

An embodiment of the invention will now be described by way of example with reference to the accompanying drawings, of which:

FIG. 1 is an axial section of a helicopter rotor blade, divided into two parts, and FIGS. 2-5 are transverse sections through the blade taken on the lines II—II to V—V respectively in FIG. 1.

The drawings show a blade for a helicopter rotor comprising a hollow spine member 1 extending along the axis of the blade from its root at the left of the upper part of FIG. 1 to its tip at the right of the lower part of the figure and encased in a sheath 2 of glass reinforced plastics material moulded to the desired external shape of the blade. For the greater part of its length, the spine member 1 is constituted by a thin steel shell which is generally cylindrical from the root to a point rather more than one-third of the way along the span (see FIGS. 2 and 3), whence it is progressively reduced in depth to become an ellipse at about two-thirds span (FIG. 4), continuing thus and decreasing in both dimensions (see FIG. 5) before becoming flattened at the blade tip. The configuration of the sheath follows that of the spine member except that its chord remains constant (apart from certain cut-away portions of the trailing edge as will be described later). Towards the root-end of the blade the thickness of the wall of the spine member 1 is gradually increased before flareng outwardly to form a flange 3. The blade sheath also follows the line of the flare to enclose the corresponding face of the flange 3. A cylindrical sleeve 4 extends axially from the other face of the flange 3 to provide support for the blade in a rotor hub (shown in dotted lines). A circular cover plate 5 fits against the flared portion of the sheath 2 and the blade is secured to the hub by bolts 6 which pass through the cover plate, the flared portion of the sheath, and the flange 3. The cover plate 5 has a central boss 7 which fits closely around a cylindrical portion of the blade sheath adjacent to the flare but with clearance from the flare itself to form an annular passage 8 around the blade at this point. Two rows of high tensile steel wires 9, 10 extend within the sheath in an axial direction beneath the spine member 1. The wires pass through the flange 3 at the root end of the blade and are riveted to it and are welded to the spine member in the region of the blade tip.

The trailing edge of the blade relative to the intended direction or rotation is provided with a series of pairs of axially-extending slots, each pair being connected to an associated channel within the blade. One pair of slots extends over the inner or root portion of the blade, a second pair extends over an intermediate portion whilst a third pair extends over the outer portion of the blade towards the tip, the respective sections being indicated by $L_1$, $L_2$, and $L_3$ in FIG. 1. In all cases the slots and their associated channels are produced by cutting away part of the blade sheath and substituting an arrangement of plates, spacers and other sections by which the original profile is substantially restored. In the tip portion of the outer section, exemplified in FIG. 5, a portion of the trailing edge has been cut away on a vertical plane, as shown in the drawing. An axially-extending angle strip 11 is attached along the upper edge of the resultant surface and a suitably profiled moulding 12 along the lower edge. A plate 13 of convoluted form is attached by one edge to a series of webs on the moulding 12, with its free edge forming a tongue between the angle strip 11 and the moulding 12 respectively but spaced from them to define slots 15, 16.

Figures 4, 5:
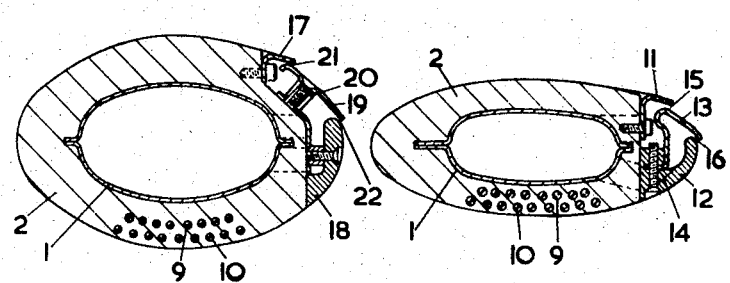

In the next portion of the section $L_3$, exemplified in FIG. 4, the trailing edge of the blade sheath is cut away both on a vertical plane and at an angle, an angle strip 17 and a moulding 18 being attached substantially as before. A plate 19 supported from the blade sheath by a number of spacing collars 20 extends between the angle strip 17 and the moulding 18 to define therewith slots 21, 22.

Figures 2, 3:
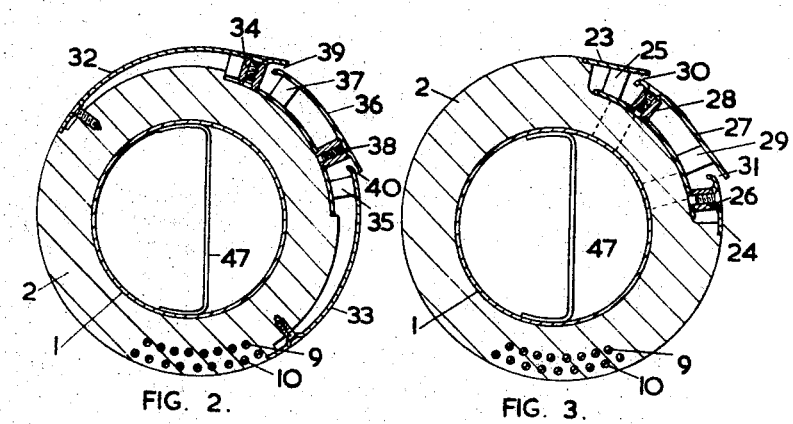

In the intermediate section of the blade, a groove which extends peripherally substantially over the upper rear quadrant of the blade, as may be seen from FIG. 3, is cut axially along the sheath. Plates 23, 24 carried on spacing collars 25, 26 fair the edges of the groove and a plate 27 carried on spacing collars 28, 29 extends between the plates 23, 24 to define with them slots 30, 31.

As shown in FIG. 2, a groove similar to that of FIG. 3 extends along the inner section of the blade but further material is removed from the circumference of the sheath extending into the adjacent quadrants. Large plates 32, 33 serve to restore the original circular profile and also fair off the edges of the groove at which points they are carried on spacing collars 34, 35. Once again, a plate 36 carried on spacing collars 37, 38 serves to close the gap and, with the plates 32, 33 defines slots 39, 40. Axially, the groove, the plates 32, 33, 36, and the cut away portion in the lower rear quadrant of the blade sheath terminate adjacent to the boss 7 in the cover plate 5 but, as may be seen from FIG. 1, the cut away portion in the upper front quadrant of the blade sheath continues into the flare on the sheath, opening out into the annular passage 8.

On the root end of the sleeve 4, and defining therewith a plenum chamber 41 is a flow distributor 42. This is generally similar to those disclosed in the aforementioned prior specifications and by an arrangement of circumferentially extending dwells and lands, serves to direct air flowing from a transfer port 43, which is divided by baffles 44, 45, to the plenum chamber 41 and a duct 46 connected to the hollow centre of the blade. The plenum chamber is connected by external pipes (not shown) to the annular passage 8 within the cover plate 5 and thence to the slots 39, 40 in the inner section of the blade. The duct 46 is divided into two passages (not shown) and the hollow centre of the blade is correspondingly divided for part of its length by a baffle 47, as shown in FIGS. 2 and 3, the right hand passage being blanked off at the end of Section $L_2$ of the blade and the left hand passage communicating with the hollow centre of the blade in the outer section ($L_3$). In the intermediate section of the blade ($L_2$), holes, shown dotted in FIG. 3, are drilled through the plastic sheath and the spine of the blade to connect the right hand passage within the blade to the cut away portion and thus the slots 30, 31 i.e., to the channel enclosed by the plates 23, 26, 27. Similarly in the outer section of the blade, holes are drilled to connect the hollow centre of the blade to the passage enclosed by the built up portions at the blade trailing edge and to the slots in this region. There are transverse barriers between the slots 39, 40 in the inner section of the blade and the slots 30, 31 in the intermediate section and between the latter and the slots 21, 22 in the outer section; the slots 15, 16 form a spanwise continuation of those last mentioned. Thus, each section of the blade has its own system of slots connected to independent air supplies, the blade being intended for use with a hub assembly such as is disclosed in the prior specifications already mentioned, in which air after passing through a non-rotating valve assembly is divided into a number of separate streams and directed to separate spanwise sections of a helicopter rotor blade.

Discharging streams of air rearwardly over a blade surface has the effect of modifying the circulation around the blade and lift can be induced on what are normally non-lifting profiles, e.g. cylindrical, and high lift coefficients can be obtained on other profiles. The use of a non-rotating valve assembly permits the lift to be varied both cyclically and overall (i.e., collectively) without the need for moving parts and the rotating hub assembly, while separating the flows to the different sections of the blade, makes it possible, by suitable valve arrangements, to vary the lift along the blade to compensate for reverse flow, compressibility effects, tip stalling and so forth. A composite blade utilizing fibre reinforced plastics as described is believed to have many advantages compared with a metal blade and many variations are possible. The foregoing embodiment is intended for use with a convertiplane in which the blades would be rigidly attached to the rotor hub and no pronounced torsional effects will be present in the blade. Thus the fibres may extend substantially longitudinally of the blade. The sheath is applied in conventional fashion, laminations of commercially available plastic impregnated woven glass fibre "cloth" being applied to the steel shell, encased in a suitably shaped could and cured by the application of heat, the work being carried out in three similar stages. The laminations are bonded together and to the steel spine.

Lift forces applied to the blade will tend to deflect it upwardly towards the tip. Though such deflection would, generally, be acceptable in conventional rotor blades, in the present case this would cause undesirable distortion of the slots in the blade surface. The high tensile wires 9, 10 act to constrain the blade within permissible limits of deflection. In the case of a similar blade used in a propeller, as for instance disclosed in prior co-pending British patent application No. 18,141/67, which may be subjected to forward and reverse thrust, wires would be used on opposite sides of the blade (relative to the axis of the propeller) to restrain deflection in both directions. However, the use of carbon fibres in place of glass fibres as reinforcement for the plastic matrix of the blade sheath would result in greater stiffness and wires would either be unnecessary or their number could be reduced. Other fibres which might be used instead of glass include boron, silicon, iron and alumina.

In a blade subjected to torsional loadings as will be experienced where changes of blade incidence are required (as, for example. In the arrangements of prior specification 22,070/67) one or more of the laminations forming the sheath would be applied so that the lay of the fibres is around the blade either circumferentially or obliquely. A lattice structure such as is described in prior co-pending British patent application No. 26,156/67 is thought to offer distinct advantages in this respect.

Various modifications of the embodiment described are possible. In one of these, separate grooves are cut in the sheath to accommodate the slots in the blade surface, and liner sections to define the slots are inserted into the grooves, which would be connected to the hollow centre of the blade by suitably drilled holes.

The liner sections may be either in one piece or in the form of complementary-shaped components.

We claim:

1. A fibre reinforced plastics blade for helicopter rotors and the like comprising a hollow spine member extending substantially along the span of the blade and provided at one end with a root portion, a sheath of fibre reinforced plastics material surrounding the spine member, and at least one spanwise extending aperture formed in the surface of the blade and connected to the interior of the spine member.

2. A fibre reinforced plastics blade according to claim 1 further comprising means dividing the spine member internally and having at least two spanwise extending apertures formed in the surface of the blade, each aperture connected to a separate portion of the interior of the spine member.

3. A fibre reinforced plastics blade according to claim 2 with apertures extending along different portions of the blade span.

4. A fibre reinforced plastics blade according to claim 1 in which each aperture is directed rearwardly relative to the intended direction of blade movement and is shaped and arranged to discharge fluid supplied to the interior of the spine member as a stream tangential to the blade surface.

5. A fibre reinforced plastics blade according to claim 1 further comprising fabricated structure attached to the sheath to define therewith a desired blade profile.

6. A fibre reinforced plastics blade according to claim 5 in which apertures formed in the blade as aforesaid are defined by the fabricated structure.

7. A fibre reinforced plastics blade according to claim 1 further comprising tie members connected to the root and to the spine member at a remote location along the blade span and arranged to limit deflection of the blade.

8. A fibre reinforced plastics blade according to claim 7 in which the tie members are high tensile steel wires.

9. A fibre reinforced plastics blade occording to claim 7 in which the tie members extend through the sheath.

References Cited

UNITED STATES PATENTS 2,226,978  12/1940  Pescara _____ 416—84UX

FOREIGN PATENTS 1,334,446  7/1963  France _____ 416—230

EVERETTE A. POWELL, JR., Primary Examiner

U.S. Cl. X.R.

416—20, 230 240